United States Patent Office 3,356,649
Patented Dec. 5, 1967

3,356,649
POLYOXYMETHYLENE-ALPHA-OLEFINIC INTERPOLYMERS
Calvin N. Wolf, Princeton, N.J., assignor to Ethyl Corporation, New York, N.Y., a corporation of Virginia
No Drawing. Filed Apr. 9, 1963, Ser. No. 271,591
4 Claims. (Cl. 260—73)

This application is a continuation-in-part of Ser. No. 181,201, filed March 20, 1962, now abandoned.

This invention relates to novel and useful high molecular weight high melting interpolymers composed principally of polyformaldehyde. This invention further relates to processes for producing these novel interpolymers.

It has been known in the past that formaldehyde was capable of being homopolymerized. Staudinger in "Die Hochmolekularen Organischen Vergindungen" (1932), set forth such a process. However, the formaldehyde polymers obtained by this process aged in air at 105° C. such that the polymer degraded or "unzipped" into monomeric formaldehyde. MacDonald, in U.S. Patent 2,768,994, discovered a new polymerization process whereby high molecular weight formaldehyde homopolymers could be produced which were tougher and withstood higher temperatures than the low molecular weight polymers of the prior art. However, this polymer which exhibited excellent properties at low temperatures tended to degrade or "unzip" at temperatures at which the polymer had to be worked. Thus, in molding operations which require high temperatures it was found that polyformaldehyde would degrade, rendering the polymer relatively useless for this valuable operation.

Many methods have been attempted to stabilize the high molecular weight formaldehyde homopolymers. A typical method employed utilizes the compounding with the formaldehyde polymer of a stabilizer additive such as hydrazines (U.S. 2,810,708), phenols (U.S. 2,871,220), ureas, thioureas (U.S. 2,893,972), amines (U.S. 2,920,059 and 2,936,298), and benzophenones (Australian 230,163). These stabilizers are compounded into the polymer after the polymerization process. The stabilizers listed above seem to prevent, to some extent, oxidation and thermal deterioration. However, degradation is still experienced at high temperatures in the presence of air. Other methods employed to prevent the "unzipping" of the polyformaldehyde are by "end capping" of the hydroxyl groups on the chain ends of the polymer as set forth for example in U.S. Patent 2,964,500. This method is successful to a certain degree, but total success is not experienced since these end capped polymers will degrade at high temperatures and also in the presence of caustic or other strongly alkaline substances. Another method of stabilization included the essentially complete removal of the polymerization catalyst from the polymer since it was believed that the presence of a polymerization catalyst in the polymer caused degradation (U.S. Patent 2,989,509). Combinations of the foregoing methods have also been tried (Australian 229,481).

Elimination of the problem of thermal degradation has also been attempted by copolymerization of formaldehyde (trioxane) with cyclic ethers which are essentially homologous to monomeric formaldehyde (U.S. 2,989,509). Copolymerization of formaldehyde with alkylene carbonates as set forth in U.S. Patent 3,012,990 has also been achieved in an attempt to produce a thermally stable copolymer. However, under certain conditions these copolymers degrade in the presence of a caustic or other similar alkaline material. All of these methods have been successful to a certain extent but none have cured all of the shortcomings such as degradation.

It is therefore an object of the present invention to provide novel interpolymers which are stable to heat, and resistant to oxidative deterioration and caustic degradation. It is a further object of the present invention to provide novel interpolymers which are tough, strong, flexible and elastic in nature. It is still a further object of the present invention to provide novel interpolymers of formaldehyde and a monoolefinic monomer which have beneficial qualities of the type outlined hereinabove. It is another object of the present invention to provide a process for producing the novel interpolymers having thermal and oxidative stability and exhibiting properties of toughness, strength and resilience. Other objects of this invention will be apparent from the ensuing description.

It has now been found that the above and other objects have been accomplished by the provision of an interpolymer of formaldehyde and a functionally substituted alpha monoolefinic monomer having the formula

wherein X is a carbon atom substituted with from 1 to 2 halogen atoms; or a hydrocarbon group (having from 1 to about 30 carbon atoms) which is substituted with a nitrile group, an ester function, one or more halogen atoms, or the like. Thus, typical groups of compounds having terminal ethylenic unsaturation which may be used in the process of this invention to produce novel copolymers are vinyl esters (e.g., acrylates, methacrylates, etc.), acroleins, acrylic acids, acrylonitrile (and the higher homologs thereof), vinyl halides, allyl halides and the like. Typical examples of the specific compounds which can be used are vinyl acetate, vinyl chloride, vinyl bromide, vinylidene chloride, methyl acrolein, acrolein, butyl acrylate, methyl methacrylate, acrylonitrile, vinyl methyl ketone, allyl bromide and the like.

In the formula above X may be further defined as a hydrocarbon group containing up to about 30 carbon atoms and having a functional group substituted thereon. The functional groups include halides, ketone groups and aldehyde groups, nitrile groups, carboxylic acid groups, ester groups, amino groups, and the like.

Generally, the amount of functionally substituted alpha monoolefinic monomer which may be present in the interpolymers of this invention ranges from about 0.1 mole percent to about 20 mole percent, based on the interpolymer. The preferred amount of alpha monoolefinic monomer ranges from about 1 to about 15 mole percent. Excellent polymers are obtained especially where the preferred mole percentage of functionally substituted alpha monoolefinic monomer is employed, the copolymers exhibiting the characteristics of polyoxymethylene in that they are tough, and resilient.

The functionally substituted alpha monoolefinic monomer employed in this invention preferably contains from 2 to about 18 carbon atoms since the copolymers obtained exhibit superior properties of thermal stability, oxidative stability, and stability to chemical degradation. The most particularly preferred olefins are those containing from 2 to 8 carbon atoms since these olefins are more economical and easily obtained.

Although not desiring to be bound by theoretical considerations, it is believed that in the novel interpolymers of this invention the functionally substituted monoolefinic hydrocarbon monomer is bonded intermittently at random to the carbon atom in the repeating formaldehyde molecule such as

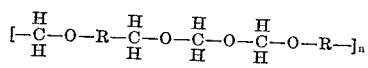

wherein R represents a saturated hydrocarbon group corresponding to the functionally substituted olefin comonomer used in forming the interpolymer.

A different formula which shows the probable theoretical molecular structure is

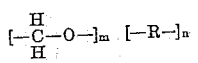

wherein $m$ is an integer representing the total number of polyoxymethylene groups in the polymer, and $n$ is a smaller integer representing the total number of hydrocarbon groups from the functionally substituted monoolefinic monomer that are present and scattered throughout the polyoxymethylene structure. Therefore $n$ is from 0.1 to 20 percent of $m$.

The novel interpolymers of this invention have high molecular weights and high melting points. The molecular weights of these novel polymers generally range from about 5,000 to about 200,000. However, the preferred molecular weights range from about 10,000 to about 150,000 since the copolymers obtained in this range are more easily adapted for the ultimate end uses, i.e., molding, drawing fibers, and the like. The molecular weight ranges are a direct function of the inherent viscosity. Thus, inherent viscosities ranging from about 0.3 to about 8.0 are desirable in the polymers of this invention. The most preferred inherent viscosities range from about 0.5 to about 5.0 since polymers having these viscosities are within the preferred molecular weight range. The inherent viscosity is preferably measured at 0.5 percent by weight in para-chlorophenol containing 2 percent alpha pinene at 60° C.

The melting point (polymer melt temperature) ranges of the novel interpolymers of this invention generally range from about 140° C. up to about 190° C. The most preferred melting point ranges for the polymers is from about 150° C. up to about 185° C. since polymers within this melting point range generally exhibit superior molding characteristics.

An important feature of the novel interpolymers of the present invention is the fact that severe thermal degradation or "the unzipping" effect is not experienced at elevated temperatures required for molding operations. Coupled with this advantageous feature is the fact that these novel interpolymers exhibit properties of toughness, resilience, strength and flexibility. Still another important feature of interpolymers of this invention is their resistance to degradation in the presence of strong caustic solutions. Formaldehyde homopolymers in the past rapidly decomposed into monomeric formaldehyde upon being treated with a strongly alkaline solution. This disadvantage is not experienced to the same extent with the present interpolymers and in many cases the only modification experienced when they are treated with a caustic solution is the removal of the terminal hydroxyl groups from the polymer. This is advantageous in that the remaining polymer is resistant to the action of acids, alkalies, heat, oxidation and aging. Thus, many of the disadvantages experienced in the prior art formaldehyde polymers have now been overcome, or at least, significantly minimized.

The term "interpolymers" as used in this invention may be further defined as polymers containing two or more monomers, as above defined, in the polymer chain. Thus, copolymers, terpolymers, tetrapolymers and the like are all within the ambit of this invention.

A further embodiment of the present invention relates to a process for producing the novel functionally substituted olefin-formaldehyde interpolymers of this invention. The novel interpolymers of this invention are produced by polymerizing any reactive form of formaldehyde which is essentially anhydrous with one or more functionally substituted monoolefinic monomers having from about 2 to about 32 carbon atoms. This polymerization process is conducted in the presence of a catalyst, the nature of which largely depends upon the type of formaldehyde being used in the reaction. Thus, when trioxane is being copolymerized with one or more monoolefinic monomers, generally a Lewis acid is employed. However, heterogeneous catalysts, i.e., silica-alumina, are also very active in this novel copolymerization process. Other catalysts such as Lewis bases are generally preferred when essentially anhydrous gaseous monomeric formaldehyde is being employed in the copolymerization reaction.

The novel process of the present invention can be conducted utilizing a wide variety of polymerization techniques, i.e., bulk polymerization, solution polymerization, emulsion polymerization, vapor polymerization, and like procedures.

Bulk polymerization is achieved by mixing a formaldehyde compound such as trioxane with a catalyst and the desired olefin. Thereafter the reaction mixture is heated to a temperature between about 50° C. to about 120° C. for a period of time sufficient to copolymerize the reaction mixture. This reaction time generally varies from a matter of seconds up to one day, a period ranging from about 3 minutes to about 12 hours usually being sufficient. The resultant polymer obtained may then be ground up and molded, or previous to molding, subjected to purification, and/or subjected to other stabilization procedures, compounded with stabilizers or the like.

Solution polymerization generally comprises contacting formaldehyde such as trioxane with a catalyst and the desired olefins in an inert solvent such as a liquid hydrocarbon at a temperature ranging from about −90° C. up to about 200° C. The reaction is generally conducted at a pressure ranging from about atmospheric up to about 20 atmospheres. The reaction is stirred and for a time sufficient to obtain the desired copolymer of the desired molecular weight after which the product is then extracted and allowed to dry. Again, subsequent treatments used in the art for improving the properties of polyformaldehyde may be used, if desired.

The inert solvents which may be employed in the solution polymerization process are any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz, alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene and gasoline, halogenated hydrocarbon compounds such as carbon tetrachloride, ethylene dibromide, methylene chloride, glycol ethers such as the dimethyl ethers of diethylene glycol, the diethyl ether of diethylene glycol, monoethers such as diethyl ether, dibutyl ether, dicyclohexyl ether, dibenzyl ether, diphenyl ether, methyl phenyl ether and the like.

Vapor polymerization comprises contacting in a reaction zone the vapors of formaldehyde and the desired olefinic monomer(s) in the presence of a catalyst at temperatures ranging from about −20° up to about 200° C. The pressure at which the vapor polymerization process can be conducted generally ranges from about atmospheric up to 200 atmospheres. The polymer may then be withdrawn as it is formed in the reaction chamber. Thereupon optional work-up and/or stabilization procedures may be utilized.

The processes as outlined above are capable of being adapted to a continuous process, a batch process or semibatch operation; for example, where vapor polymerization reaction is being conducted it may readily be converted to a continuous process by merely adding the reactants and catalysts to the reaction zone while recovering the interpolymer as soon as it is formed. An excellent example of a batchwise process is the bulk polymerization of a formaldehyde such as trioxane with an olefin after which the desired polymer may then be recovered.

Generally it is preferred to employ an essentially anhydrous inert atmosphere over the reaction mass particularly when bulk polymerization techniques are being employed. However, an inert atmosphere may be employed in other polymerization processes such as the solution polymerization and vapor polymerization. Typical of the inert gases which may be employed are carbon monoxide, nitrogen, argon, krypton, neon, helium and the like. Certain saturated paraffinic hydrocarbons may also be employed as the inert atmosphere where the hydrocarbons are inerted to the reaction mass. Examples of paraffinic hydrocarbons which may be employed are methane, ethane, propane and the like.

The formaldehyde employed, as stated hereinabove, can be any reactive form of formaldehyde in the essentially anhydrous state. Monomeric formaldehyde and trioxane are the best known reactive anhydrous forms which may be used. Monomeric formaldehyde can be produced by any of the general prior art methods such as is set forth by Walker in "Formaldehyde," A.C.S. Monograph Series No. 98 (1944). Typical methods employed to obtain monomeric formaldehyde are by pyrolyzing paraldehyde, polyoxymethylene or other forms of formaldehyde. However, it is preferred in this invention to employ trioxane since it is easier to handle, especially in bulk polymerization processes. On the other hand, in vapor polymerization processes it is more desirable to employ gaseous monomeric formaldehyde which is essentially anhydrous since this compound is more easily vaporized.

Typical of the Lewis acids which are employed as catalysts in the process of this invention are the inorganic halides, particularly the inorganic fluorides, inorganic fluorides complexed with ethers and amines, metal alkoxides, sulfonyl halides, metalloidal halides, hydrogen halides and the like. The most preferred Lewis acid catalysts are boron trifluoride, boron trifluoride etherate complexes, and boron trifluoride amine complexes since excellent results are achieved in bulk polymerization processes employing trioxane as the formaldehyde reactant.

Typical of the Lewis bases which may be employed in the process of this invention, when utilizing gaseous monomeric formaldehyde as the formaldehyde monomer, are the organo phosphines, organo stibines, organo arsines, primary amines, secondary amines, tertiary amines, the alkali and alkaline earth hydroxides, oxides and peroxides and the like.

Other catalysts which may be employed in association with gaseous monomeric formaldehyde and alpha olefins in the present polymerization process are onium salts, metals, metal alloys, metal carbonyls, as well as various oxides, peroxides and hydroxides of the heavy metals.

The types of heterogeneous catalysts may be broadly defined as metal oxides, mixed metal oxides, acid clays, acid treated clays, and ion exchange resins. Acid types of heterogeneous catalysts generally are used in the polymerization of trioxane while the basic catalysts are employed in the polymerization of monomeric formaldehyde. However, acid ion exchange resins may be in some instances employed in both the copolymerization of trioxane or monomer formaldehyde and the alpha olefin.

Typical examples of the heterogeneous catalysts are silica-alumina, silica magnesia, silica zirconia, alumina boria, alumina magnesia, silica gel, Permutit S–2 (which is understood to be aluminum silicate), alumina chromia, Amberlite IR (which is understood to be a phenolic methylene sulfonic cation exchanger produced by the reaction of phenol, formaldehyde and a sulfonic acid), montmorillonite and the like.

The amount of catalyst which may be employed in the process of this invention is susceptible of variation. Generally, amounts ranging from about 0.001 to about 5 percent by weight of the total reaction mass may be employed. However, the preferred amount of catalyst ranges from about 0.01 percent to about 2 percent by weight since within this range polymers having optimum properties such as strength, toughness and resilience are obtained. The amount of catalyst employed in the present invention, although not critical, forms an important element of the process. Thus, it is desirable to keep the catalyst concentration within the preferred range outlined above.

The temperature at which the polymerization process is conducted varies with the type of process employed. Thus, in bulk polymerization processes temperatures ranging between about 50° C. up to about 120° C. are employed. In the solution polymerization processes reaction temperatures may vary from about −90° C. up to about 200° C. whereas in vapor polymerization processes temperatures between about −20° C. up to about 200° C. are employed.

The combination of temperature and the amount of catalysts employed has a direct bearing on the molecular weight of the polymer which is produced via this invention. Thus, in general, high conversions of low molecular weight copolymers are obtained when high catalyst levels coupled with low polymerization temperatures are used. The same phenomenon occurs where a low catalyst concentration is employed coupled with high temperature. The preferred combination of temperature and amount of catalyst whereby a polymer having a high molecular weight or high inherent viscosity is produced involves use of a low catalyst level and low polymerization temperature. Thus, in a bulk polymerization process temperatures ranging between about 65° C. up to about 85° C. and catalyst concentrations varying from about 0.01 percent to about 2 percent (based on the total weight of monomers being used), are preferred in accordance with this invention. In the preferred solution polymerization process the temperature ranges from about 0° C. up to about 90° C., the catalyst concentration being the same as in the preferred bulk polymerization process.

The pressure employed in the polymerization processes of this invention depends generally on the type of formaldehyde, olefin, and catalyst being used and on the type of process technique being utilized. Thus, in the solution polymerization and vapor polymerization procedures the pressure generally ranges from atmospheric up to about 20 atmospheres. These mild pressure conditions obviate the necessity for expensive high pressure reaction equipment. In most cases, it is preferable to conduct the process of this invention at atmospheric or ambient pressures.

The processes by which these novel copolymers are produced will be further understood from the following examples. In all of the examples all parts are by weight unless otherwise specified.

EXAMPLE I

Using the bulk polymerization technique, 50 parts of trioxane was mixed with 6 parts of acrylonitrile and 0.06 part by volume of boron trifluoride diethyl etherate catalyst. The mixture was stirred at 90° C. for 40 minutes under dry nitrogen. The solid polymer was recovered and ground to obtain a polymer having a melt temperature of 172° C., a crystalline melting point of 157° C. and an inherent viscosity of 0.4. The polymer was obtained in a 63 percent yield.

EXAMPLE II

Using bulk polymerization techniques as outlined in Example I, 50 parts of trioxane was mixed with 4 parts of butyl acrylate and 0.2 part by volume of boron trifluoride diethyl etherate catalyst. The mixtured was heated to 90° C. for one hour after which the polymer was recovered in 36 percent yield. The polymer obtained had a polymer melt temperature of 178° C., a crystalline melting point of 149° C., and an inherent viscosity of 1.49. A carbon-hydrogen analysis was run on the copolymer indicating the carbon content to be 40.80 and hydrogen to be 7.15.

EXAMPLE III

The method of Example II was repeated except that 4 parts of methyl acrolein and 0.02 part by volume of boron trifluoride diethyl etherate catalyst were used and the polymerization was run at 70° C. for a period of one hour. The trioxane-methyl acrolein copolymer was recovered in 59 percent yield. It had a polymer melt temperature of 172° C. and a crystalline melting temperature of 155° C.

EXAMPLE IV

The process of Example II was repeated with the exception that 6 parts of methyl methacrylate and 0.7 part by volume of boron trifluoride diethyl etherate catalyst were used, the polymerization being conducted at 70° C. for one hour. The trioxane-methyl methacrylate copolymer was obtained in a 55 percent conversion having a polymer melt temperature of 177° C. and a crystalline melting point of 155° C. The copolymer had an inherent viscosity of 0.31.

EXAMPLE V

Example II was repeated except that vinyl acetate (6 parts) was used as the comonomer with 0.6 part of antimony trifluoride and 0.6 part by volume of boron trifluoride diethyl etherate as the catalyst. The polymerization was conducted at 70° C. for a period of one hour. The interpolymer was obtained in a 3 percent conversion.

EXAMPLE VI

Example II was repeated using methyl vinyl ketone (2.97 parts) as the ethylene monomer and 0.6 part by volume of boron trifluoride diethyl etherate as the reaction initiator. The reaction was run at 70° C. for a period of one hour. The trioxanemethyl vinyl ketone copolymer was obtained in a 27 percent conversion, and had a polymer melt temperature of 176° C. and a crystalline melting point of 155° C.

EXAMPLE VII

Acrylic acid (6 parts) was copolymerized with 50 parts of trioxane using 0.06 part by volume of boron trifluoride diethyl etherate catalyst at 70° C. for one hour. The copolymer obtained was in the form of a viscous gel. The amount of copolymer obtained was equivalent to a 22 percent yield.

It should be noted that when the above experiments are repeated using other compounds having ethylenic unsaturation according to the latter formula given above, similar interpolymers are obtained. Thus, vinyl halides, other esters of acrylic acid, allylic esters and the like, may be successfully used.

EXAMPLE VIII

Into a reaction pot equipped with a high speed stirrer was charged 100 parts of trioxane, heptane (25 parts by volume) and 5 parts of vinyl butyrate. The essentially anhydrous mixture was flushed with dry nitrogen and stirred for 6 hours. Boron trifluoride diethyl etherate (0.12 parts per hundred) was added to the reaction mixture while stirring. The temperature of reaction mixture was maintained at 55° C. The polymer was washed with methyl alcohol and then washed with ammonium hydroxide. The results of the two copolymerization runs are set forth in the data of Table I.

TABLE I.—SOLUTION COPOLYMERIZATION OF s-TRIOXANE AND VINYL BUTYRATE AT 55° C. WITH BORON TRIFLUORIDE-DIBUTYL ETHER

| Comonomer | Phr. Monomer | BF$_3$·Et, Phr. | Time to Solidify, Min. | Conversion, Percent | | PMT,[1] ° C. | Tm,[2] ° C. | $\eta_{inh}$[3] |
|---|---|---|---|---|---|---|---|---|
| | | | | After MeOH | After NH$_4$OH | | | |
| Vinyl Butyrate | 5.0 | 0.40 | 350 | 78.8 | 56.4 | 165 | 154 | 0.16 |
| Do | 5.0 | 0.48 | 260 | 83.4 | 56.6 | 165 | 153 | 0.14 |

[1] PMT = Polymer melting temperature.
[2] Tm = Polymer melting point.
[3] $\eta_{inh}$ = Inherent viscosity at 0.2% by weight in para-chlorophenol.

Similar copolymers are obtained with other monomers such as β-chloroacrylonitrile, vinylidene chloride, vinyl bromide, vinylidene bromide, vinyl acetate, vinyl dodecanoate, vinyl palmitate, vinyl stearate, allyl cyanide, 3-fluoropropene, 3-iodopropene, alpha methyl acrolein, isobutyl acrylate, n-butyl acrylate, cyclohexyl acrylate, alpha chloroacrylate, acrylamide and the like.

EXAMPLE IX

In this example, eight polymerization runs were made employing vinyl chloride, acrylonitrile, and methyl methacrylate copolymerized with monomeric formaldehyde in the presence of anionic catalysts. The comonomer and solvent were added to a vessel equipped with an inlet and outlet port. To this reaction mixture was added the desired anionic catalyst while thoroughly mixing the contents of the reactor. To this mixture was added gaseous monomeric formaldehyde. The results of these runs are set forth in the data of Table II.

TABLE II.—COPOLYMERIZATION OF FORMALDEHYDE WITH VINYL CHLORIDE AND ACRYLONITRILE WITH ANIONIC CATALYSTS

| Comonomer | Phr. Comonomer | Solvent | Catalyst | Phr. Catalyst | Temperature, ° C. | Yield, g. | $\eta_{inh}$ |
|---|---|---|---|---|---|---|---|
| Vinyl Chloride | 5 | Heptane | A | 0.1 | 25 | 25 | 1.2 |
| Acrylonitrile | 5 | do | B | 0.1 | 25 | 23 | 1.4 |
| Methyl Methacrylate | 5 | do | B | 0.1 | 25 | 26 | 1.9 |
| Vinyl Chloride | 5 | do | B | 0.1 | 25 | 20 | 2.2 |
| Do | 5 | do | B | 0.1 | 25 | 52 | 1.3 |
| Do | 5 | Acetonitrile | B | 0.1 | 25 | 21 | 0.5 |
| Do | 5 | Heptane | C | 0.1 | 5 | 15 | 2.3 |
| Do | 5 | do | D | 0.1 | 25 | 40 | 2.1 |

A = Sodium-pyridine.
B = NiCl$_2$·(Bu$_3$P).
C = Ni Acetylacetonate.
D = Sodium-naphthalene.
$\eta_{inh}$ = Inherent viscosity at 0.5% by weight of polymer in para-chlorophenol.
Phr. = Parts per hundred.

Similar copolymers are obtained when comonomers are employed such as vinyl bromide, vinylidene chloride, 4-bromo-1-butene, diallylamine, vinyl fluoride, vinyl iodide, acrylic acid and the like.

EXAMPLE X

Four copolymerization runs were made employing trioxane and vinyl butyrate in the presence of boron trifluoride diethyl etherate as a catalyst. These polymerization runs employed the solution polymerization technique using cyclohexane as a solvent. The concentration of comonomer, catalyst, polymerization temperature as set forth in Table III.

TABLE III.—POLYMERIZATION OF TRIOXANE AND VINYL BUTYRATE

| Comonomer, Phr. | Polymer Temp., °C. | Catalyst, ml. | Time to Solidify, Min. | Conversion, percent | PMT, °C. | Tm, °C. |
|---|---|---|---|---|---|---|
| 5.0 | 55 | 0.70 | ------ | 60.9 | 169 | 160 |
| 5.0 | 70 | 0.60 | 55 | 75.0 | 167 | 156 |
| 2.5 | 70 | 0.40 | 75 | 75.0 | 175 | 158 |
| 2.5 | 55 | 0.60 | 75 | 75.0 | 179 | 158 |

PMT = Polymer melting temperature.
Tm = Crystalline melting point.

EXAMPLE XI

Six copolymerization runs were made polymerizing acrylonitrile and monomeric formaldehyde using sodium pyridine as catalyst. The polymerization technique employed was solution polymerization employing both aliphatic and aromatic solvents. The results and conditions are set forth in the data of Table IV.

TABLE IV.—SOLUTION COPOLYMERIZATION OF FORMALDEHYDE AND ACRYLONITRILE WITH SODIUM-PYRIDINE

| Acrylonitrile, Mole | Temperature, °C. | Solvent | Amount of Solvent [a] | HCHO Purged, g. | Reaction [b] Time, Min. | Conversion, Percent After MeOH | PMT, °C. | Tm, °C. |
|---|---|---|---|---|---|---|---|---|
| 0.5 | −50 | Heptane | 600 | 100.2 | 102 | 14.2 | 187 | 154 |
| 1.0 | −50 | Heptane | 600 | 141.9 | 111 | 20.0 | 198 | 156 |
| 1.0 | 0 | Heptane | 600 | 127.5 | 171 | 6.3 | | |
| 1.0 | 0 | Heptane | 600 | 88.0 | 146 | 9.8 | | |
| 0.5 | 25 | Heptane | 750 | 53.4 | 135 | 21.2 | 192 | 155 |
| 0.5 | 25 | Toluene | 650 | 101.5 | 215 | 1.7 | | |

[a] Parts by volume.
[b] The interval between the time the pyrolysis flask is joined to the apparatus until the reaction solution is quenched with methanol.
PMT = Polymer melting temperature.
Tm = Crystalline melting point.

The novel interpolymers of the present invention are resistant to chemical degradation. When the copolymers of this invention are treated with a 10 percent aqueous sodium hydroxide solution at temperatures between room temperature and reflux temperature for from about one minute to about one hour, the net polymer loss ranges from about 2 percent to about 70 percent. Thus, in preparing the novel copolymers of this invention, it is desirable to first submit the raw copolymer product to a caustic treatment. Thus, in treating the crude copolymer it is desirable to use an alkaline solution having a pH of between about 8 and about 14 at about room temperature up to about 90° C. for a time ranging from about 1 to about 10 minutes. For reasons of economy and time, it is desirable to contact the crude copolymers of this invention with a 10 percent aqueous sodium hydroxide solution. The products thus obtained are even more stable to heat, light and oxidation. The strong bases which can be used in this preferred after-treatment include the alkali and alkaline earth metal hydroxides, oxides, carbonates, acetates and the like, strong organic bases, ammonia and the like. Typical examples of these bases which may be employed are potassium hydroxide, calcium oxide, barium hydroxide, magnesium oxide, sodium carbonate, sodium acetate, calcium propionate, ammonia, dimethyl amine, diethyl amine, dipropyl amine, dibutyl amine, tetramethyl guanidine and the like.

In effecting this after treatment systems other than aqueous alkaline systems may be employed. Thus, the appropriate strong base may be dissolved in a solvent such as dimethyl formamide, benzyl alcohol, methanol, anisole, ethylene glycol or the like. In some instances, alkaline solvent systems which contain an hydroxyl group such as benzyl alcohol, methanol and ethylene glycol, function as the agent of controlled degradation even in the absence of the above basic substances.

Typical of the Lewis acid catalysts which may be employed in the process of this invention are antimony trifluoride, antimony fluoborate, bismuth fluoride, bismuth oxyfluoride, nickelous fluoride, aluminum trifluoride, titanium tetrafluoride, manganous fluoride, manganic fluoride, mercuric fluoride, silver fluoride, zinc fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, thionyl chloride, phosphorous trichloride, stannic chloride, titanium tetrachloride, zirconium chloride, boron trifluoride, diethyl etherate complex, boron trifluoride dibutyl etherate complex, boron fluoride complexes of aryl amines such as aniline, alpha naphthyl amine, pentanaphthyl amine, diphenyl amine and benzidine, boron trifluoride complexes of pyridine, phenothiazine, glycine, alpha alanine, semicarbazide, urea and the like.

Typical examples of Lewis base catalyst which may be employed in the process of this invention are triphenyl phosphine, tritolyl phosphine, trixylyl phosphine, trinaphthyl arsine, tributyl phosphine, triethyl stibine, dimethyl phenyl arsine, tricyclohexyl phosphine, methyl dioctyl stibine, dixylyl ethyl arsine, trimethyl amine, triethyl amine, trihexyl amine, diethyl amine, di-N-propyl amine, dioctyl amine, cyclohexyl amine, dicyclohexyl amine, piperidine, N-ethyl piperidine, morpholine, N-methyl morpholine, pyrrolidene, N-ethyl pyrrolidine, cesium hydroxide, strontium hydroxide, rubidium hydroxide, sodium hydroxide, potassium hydroxide, lithium hydroxide, barium hydroxide, calcium hydroxide, sodium oxide, sodium peroxide, barium peroxide and the like.

Typical examples of onium salts which may be employed as catalysts are trimethyl stearyl ammonium laurate, tetra-N-butyl ammonium laurate, triethyl benzyl ammonium laurate, benzyl trimethyl ammonium nonyl phenolate, dimethyl diammonium acetate, dimethyl diammonium benzoate, dimethyl dioctadecyl ammonium acetate, N,N-diethyl piperdinium chloride, tetra-N-butyl ammonium iodide, N-phenyl ethyl tetramethylene ammonium iodide, dibutyl octadecamethylene ammonium acetate, bis-(tri-N-butyl ammonium iodide)propane, betaine methyl ester of N-methyl-N-phenyl glycine, 1-(carboxy methyl)pyridinium betaine, (carboxy methyl) tridecyl ammonium chloride, triethyl octadecyl phosphonium bromide, tetraethyl phosphonium iodide, tributyl ethyl phosphonium iodide, phenyl ethyl pentamethyl phosphonium acetate, bis-(triethyl phosphonium acetate)-butane, tributyl sulfonium bromide, trimethyl sulfonium iodide, phenyl dibutyl sulfonium acetate, cyclohexyl diethoxy sulfonium benzoate and the like.

Metal alloy catalysts which may be employed in the process of this invention are alloys of aluminum with copper, silver, gold, beryllium, magnesium, calcium, strontium, barium, zinc, cadmium, mercury, silicon, titanium, zirconium, germanium, tin, lead, vanadium, niobium, tantalum, antimony, bismuth, chromium, molybdenum, tungsten, manganese, iron and nickel. Specific alloys which have been satisfactory in the past are aluminum magnesium alloys, aluminum cobalt alloys, aluminum copper alloys, aluminum copper manganese alloys, aluminum silicon alloys, aluminum zinc alloys, aluminum magnesium titanium alloys, and alloys containing aluminum cadmium, zinc, calcium and lithium as well as amalgams of all of the alloys listed hereinabove.

Typical of the organometallic compounds which may be used in the process of this invention as catalysts are phenyl lithium methoxy phenyl sodium, decoxy sodium, copper mercaptide, copper abietate, copper stearate, methyl magnesium iodide, phenyl magnesium bromide, diethoxy magnesium calcium hydride, dimethyl cadmium, diphenyl mercury, calcium isopropioxide, aluminum stearate, tetraisopropyl titanate, diphenyl tin, triphenyl bismuth, dicyclopentadienyl iron, triethyl aluminum, trimethyl aluminum, tri-N-butyl aluminum, triisopropyl aluminum, cobalt carbonyl, iron carbonyl, nickel carbonyl and the like.

Typical of the heterogeneous mixtures of catalysts which may be employed in the process of this invention are silica alumina, Amberlite IR (acid form) as described hereinbefore, montmorillonite (mixture of silica alumina and magnesia), silica gel, Permutit S-2 (basic form) as described hereinbefore, alumina chromia, silica magnesia, silica boria, silica zirconia, alumina boria, as well as other metal oxides, mixed metal oxides and ion exchange resins.

Other forms of heterogeneous catalysts which may be used in the process of this invention are disclosed in "Ion Exchange Technology," Academic Press, New York (1956); "Ion Exchange Resins," by Kunin and Myers, John Wiley and Sons (1950); and "Dowex Ion Exchange," The Dow Chemical Company (1958).

Typical examples of the functionally substituted alpha monoolefinic monomers which may be employed in the present invention are β-chloroacrylonitrile, vinylidene chloride, vinylidene bromide, vinylidene, iodide, vinyl bromide, vinyl chloride, vinyl iodide, vinyl acetate, vinylidene acetate, vinyl acetonitrile, vinyl amine, vinyl dodecanoate, vinyl triacontanate, vinyl palmitate, vinyl stearate, allyl acetonitrile, 2-methyl-4-pentene nitrile, 1,2-dimethyl, 4-pentenyl amine, 3-fluoropropene, 3-chloropropene, 3-iodopropene, alpha methyl acrolein, alpha chloroacrolein, butyl acrylate, cyclohexyl acrylate, alpha chloroacrylate, 4-bromo-1-butene, diallyl amine, vinyl methyl ketone, vinyl octacosyl ketone, vinyl chloromethyl ketone, acrylic acid, methacrylic acid, methyl methacrylate, acrylonitrile, methacrylonitrile and the like.

Although the polymers of this invention have improved resistance to chemical and physical degradation, nevertheless for some uses it may be desirable to make use of previously known stabilization techniques in order to effect still further improvement in stability. The techniques which may be so used are in general those procedures which have heretofore been successfully used with hitherto known polyformaldehyde polymers and copolymers. Therefore stabilizer additives may be compounded with the novel polymers of this invention. Typical of these stabilizer additives are hydrozines (U.S. 2,810,708); hydrozones (Belgian 597,962); phenols (U.S. 2,871,220); ureas and thioureas (U.S. 2,893,972); sulfides and polysulfides (Belgian 599,409); amines (U.S. 2,920,059 and 2,936,298); oxalic diamides (Belgian 584,257); polysulfonic acids (Belgian 585,164); hydroxy anthroquinone (Belgian 585,165); and benzophenones (Australian 230,163). These stabilizers may be compounded with the novel interpolymers of this invention after the polymerization reaction has been completed.

Similarly the interpolymers may be end capped in lieu of the preferred caustic after treatment step, by reacting the terminal hydroxyl groups of the copolymer with an anhydride such as acetic anhydride (U.S. 2,964,500); or a dialkyl acetal (Belgian 570,884); to esterify the groups.

The polymers may also be subjected to a combination of the compounding of stabilizers and end capping. Thus one may end cap the crude polymer by reacting the polymer with an anhydride and thereafter compound stabilizers such as hydrazines, phenols, ureas, and the like, with the polymer product.

Another technique by which additional stabilization may be achieved is to rigorously remove catalyst residues from the novel polymers of this invention. Thereupon, if desired, a stabilizer additive or end capping procedure, or both, may be utilized.

A still different combination which may be used to further stabilize the interpolymers involves caustic treatment followed by addition of stabilizers. Any of the stabilizers referred to hereinabove may be employed subsequent to the preferred caustic after treatment step. This combination of caustic after treatment and subsequent addition of stabilizers is the most preferred method of giving additional stabilization of the interpolymers of this invention.

In all cases where a stabilizer additive is used, it is compounded with the interpolymer in a proportion of between about 0.003 and 15 percent by weight, based on the weight of the polymer. It should be noted that the stabilizers may, in some instances, be added prior to the caustic degradation step. However, it is preferred in most instances to add the stabilizers after the caustic degradation step since a polymer is obtained via this method which is more resistant to thermal degradation and oxidative deterioration.

The copolymers of this invention are useful for the preparation of films (as disclosed in U.S. 2,952,878), sheets, funicular structures such as fibers, filaments, bristles, rods, tubes and molding powders. Thus, the copolymers of this invention may be employed in any general use for which known tough and thermally stable thermoplastic polymers have been put.

Typical methods of molding the interpolymers of this invention are those techniques set forth in "Polymer Processes," Volume X, "High Polymers" by Schildknecht, Interscience Publishers, New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

What is claimed is:

1. A linear, thermoplastic copolymer consisting of recurring $(-CH_2O-)$ groups interspersed with recurring $(-H_2C-CCl_2-)$ groups.

2. A process for preparing a copolymer composition having a high degree of thermal stability which comprises copolymerizing under substantially anhydrous conditions, in an anhydrous organic liquid reaction medium which is inert to the comonomers and to the catalyst, for a time period of 2 to about 6 hours, at a temperature within the range of 0° C. to 100° C. and in the presence of an ionic organometallic polymerization catalyst, formaldehyde with from about 0.1 to about 20 mole percent of vinylidene chloride; and recovering a solid copolymer containing recurring oxymethylene units and recurring units derived from the said vinylidene chloride.

3. A process for preparing a copolymer composition having a high degree of thermal stability which comprises copolymerizing under substantially anhydrous conditions, in an anhydrous organic liquid medium which is inert to the comonomers and to the catalyst, for a time period of 2 to about 6 hours, at a temperature within the range of 0° C. to 100° C. and in the presence of an ionic organometallic polymerization catalyst having the formula $MR_n$, where R=hydrocarbon radical, M=metal(s) of Groups 1–3 of the Periodic Table of elements, and a mono- or dihalide of the metals of Groups 1–3, and n=number of metal-hydrocarbon bonds, formaldehyde with from about 0.1 to about 20 mole percent vinylidene chloride; and recovering a solid copolymer containing recurring oxymethylene units and recurring units derived from the said vinylidene chloride.

4. A process for preparing a copolymer composition having a high degree of thermal stability which comprises polymerizing under substantially anhydrous conditions, in an anhydrous organic reaction medium which is inert to the comonomers and to the catalyst, for a time period of 2 to about 6 hours, at a temperature within the range of 0° C. to 100° C. and in the presence of phenyl magnesium bromide as the polymerization catalyst, formaldehyde with from about 0.1 to about 20 mole percent vinylidene chloride; and recovering a solid copolymer containing recurring oxymethylene units and recurring units derived from the said vinylidene chloride.

References Cited
UNITED STATES PATENTS

| | | | |
|---|---|---|---|
| 3,272,780 | 9/1966 | Wilson et al. | 260—73 |
| 3,293,215 | 12/1966 | Koral | 260—64 |
| 3,296,210 | 1/1967 | Wilson et al. | 260—73 |

WILLIAM H. SHORT, *Primary Examiner.*

JAMES A. SEIDLECK, *Examiner.*

L. M. PHYNES, *Assistant Examiner.*